Feb. 9, 1954
A. Z. THOMPSON
2,668,388
APPARATUS FOR DISCHARGING FINELY DIVIDED
MATERIALS UNDER PRESSURE
Filed July 27, 1951
2 Sheets-Sheet 1
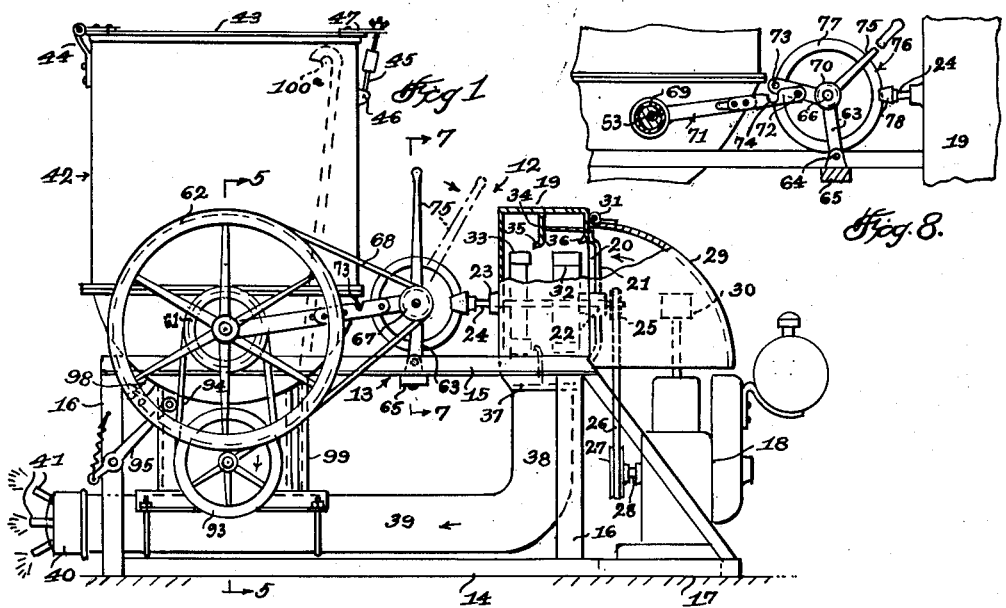
Inventor
ALONZO ZEB THOMPSON
By John N. Randolph
Attorney

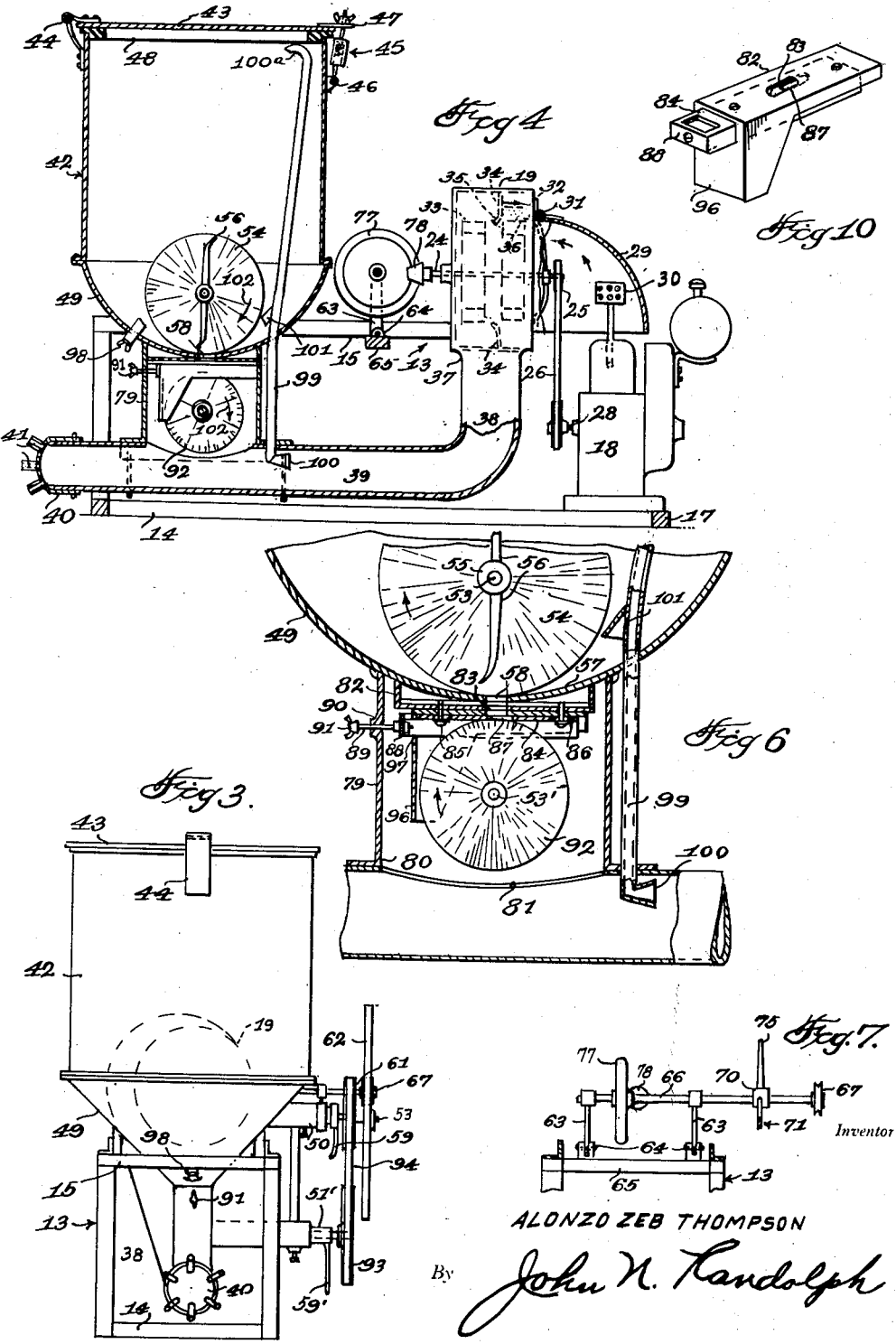

Patented Feb. 9, 1954

2,668,388

UNITED STATES PATENT OFFICE 2,668,388

APPARATUS FOR DISCHARGING FINELY DIVIDED MATERIALS UNDER PRESSURE

Alonzo Zeb Thompson, Selma, N. C.

Application July 27, 1951, Serial No. 238,974

6 Claims. (Cl. 43—148)

This invention relates to a novel apparatus for discharging finely divided materials under pressure in regulated quantities and for additionally heating the material in the apparatus from which the material is discharged for maintaining the material in a dry state and in a finely divided form.

More particularly, it is a primary object of the present invention to provide an apparatus of the character described especially adapted for use in dispensing insecticide in a finely divided or powdered form and which may be employed efficiently for dusting or spraying growing plants by mounting the apparatus on a mobile support such as a trailer vehicle or self-propelled vehicle.

A further object of the invention is to provide a novel means for agitating the materials to be dispensed and for especially controlling and regulating the discharge of the material whereby discharge of the material at a uniform rate may be accomplished.

Still a further object of the invention is to provide a novel means for utilizing a power source employed for driving the apparatus for the secondary purpose of heating the air admitted to the apparatus.

Various other objects and advantages of the invention will hereinafter become more fully apparent from the following description of the drawings, illustrating a presently preferred embodiment thereof, and wherein:

Figure 1 is a side elevational view, partly in vertical section illustrating a preferred embodiment of the invention;

Figure 2 is a top plan view thereof;

Figure 3 is an end elevational view thereof looking from left to right of Figures 1 and 2;

Figure 4 is a longitudinal sectional view, partly in side elevation, taken substantially along a plane as indicated by the line 4—4 of Figure 2;

Figure 5 is an enlarged fragmentary cross sectional view taken substantially along a plane as indicated by the line 5—5 of Figure 1;

Figure 6 is a fragmentary longitudinal sectional view, partly in side elevation, taken substantially along a plane as indicated by the line 6—6 of Figure 5;

Figure 7 is a fragmentary cross sectional view of a portion of the apparatus, taken substantially along a plane as indicated by the line 7—7 of Figure 1;

Figure 8 is a fragmentary side elevational view, partly in section, showing certain of the parts in a disengaged position;

Figure 9 is a fragmentary cross sectional view taken substantially along a plane as indicated by the line 9—9 of Figure 5, and Figure 10 is a perspective view of a part of the apparatus.

Referring more specifically to the drawings, the dispensing apparatus in its entirety is designated generally 12 and includes a supporting frame, designated generally 13 having an elongated rectangular base or bottom portion 14 which is adapted to be secured to a suitable mobile support, not shown, such as a trailer or self-propelled vehicle. The frame 13 also includes a top portion 15 which is supported above the base 14 by a plurality of upright supporting legs 16, which likewise constitute a part of the frame 13.

One end of the base 14 is provided with an extension 17 which projects beyond the complementary end of the top portion 15 and on which is supported and secured a suitable power source such as an internal combustion engine 18. A fan casing 19 is supported on and secured to the end of the top portion 15 located adjacent the engine 18 and is provided with a relatively large inlet opening 20 in the side thereof disposed adjacent the engine 18. A spider-shaped member 21 is secured to said aforementioned casing side around its opening 20 and includes a centrally disposed bearing 22 which aligns with a bearing 23 formed in the opposite, closed side of the casing 19. A fan shaft 24 extends axially through the fan casing 19 and is journaled adjacent its ends in the bearings 22 and 23. A pulley 25 is fixed to the end of the shaft 24 disposed adjacent the engine 18 and is connected by an endless belt 26 to a pulley 27 which is disposed therebeneath and which is fixed to the drive shaft 28 of the engine 18. A downwardly opening hood 29 is disposed around the fan inlet 20 and opens downwardly above and adjacent the engine 18. An exhaust pipe 30 of the engine 18 preferably opens into the hood 29 and said hood is hinged at its upper edge at 31 to the upper portion of the casing 19 for swinging movement upwardly and away from the engine to expose the belt pulley 25.

A pair of centrifugal impellers 32 and 33 are rotatably disposed in the casing 19 and fixed to and driven by the shaft 24. An annular partition 34 is disposed in the casing 19 between said impellers and has a flared annular inner edge 35 extending away from the opening 20 and toward the impeller 33. The opening 20 is similarly defined by an inwardly extending annular flared portion 36 so that the air entering the fan casing 19 will be initially picked up by the impeller 32 disposed adjacent the inlet 20 and when ejected therefrom will be directed by the flared lip 35 and drawn by the impeller 33 toward said last mentioned impeller, from which the air will be expelled centrifugally through the outlet 37 in the bottom of the casing 19, to which is connected the upturned inlet end 38 of a pipe or conduit 39 which extends longitudinally of the frame and to beyond its opposite end. The other, outlet end of the pipe 39 is provided with a manifold 40 having a number of outlet tubes or nipples 41, each of which may be connected to a discharge hose or flexible conduit, not shown.

A hopper 42 is mounted on and secured to the top portion 15 adjacent the opposite end of the frame 13 and has an open top through which the hopper is filled and which is normally sealed by a closure 43 which is swingably connected by a hinge 44 to the hopper and which is latched in a closed position by an adjustable spring latch 45 which is pivoted at 46 to the hopper and which includes a bifurcated plate 47 which is secured to and projects from the lid 43, in the slot of which the spring retracted bolt of the latch 45 detachably engages, as best seen in Figure 2. The latch 45 is of a conventional type including reciprocally connected end sections which are urged toward retracted positions by the spring and the outer end section of which includes a bolt which detachably engages the plate notch and which carries an adjustable stop, such as a wing nut. As seen in Figure 4, the closure 43 is provided with an annular sealing gasket 48 providing an airtight seal for the top of the hopper 42 when the closure is latched tightly in a closed position. The hopper 42 has a tapered bottom 49 through a portion of which extends a rigid bushing 50 in which is mounted a bearing sleeve 51 having an eccentrically disposed bore 52, as best seen in Figures 5 and 9. A shaft 53 extends through and is journaled in the bore 52 and has a circular brush 54 fixed to its inner end between a pair of hubs 55 from each of which project a plurality of agitator elements 56 which are disposed on opposite sides of the brush 54. The brush 54 may have bristles of any suitable material such as wire or fiber and a portion of said brush contacts or substantially contacts a bottom surface 57 of the hopper and directly above an opening 58 therein. The upper surface of said bottom portion 57 is concave and arced in the direction of the adjacent portion of the periphery of the brush 54, as best seen in Figure 6.

The sleeve 51 projects beyond the outer end of the bushing 50 and has a turning lever 59 fixed to its outer end. A setscrew 60 is threaded inwardly through an outer portion of the bushing 50 to secure the sleeve 51 against rotation within said bushing after said sleeve has been adjusted by the lever 59 to displace the shaft 53 upwardly or downwardly for moving the brush 54 toward or away from the outlet 58, by which the amount of material dispensed may be varied.

Two belt pulleys 61 and 62 are fixed to the shaft 53 outwardly of the sleeve 51. Between the fan casing 19 and hopper 42, a pair of upwardly extending bearing arms 63 is swingably mounted on pivots 64 which are secured to and rise from a cross brace 65 of the frame 13, as best seen in Figure 7. A shaft 66 is journaled in the upper ends of the bearing arms 63 and has a belt pulley 67 fixed to one end thereof and connected to the belt pulley 62 by an endless belt 68. A collar 69 is turnably mounted on the outer end of the bushing 50 and is connected to a collar 70, which is turnably mounted on the shaft 66 by a link 71 formed of end sections which are pivotally connected to one another at 72, as seen in Figure 8, and one of which sections has an inner end provided with a transverse pin 73 which engages in notches of the other section as seen at 74 to normally maintain the link in a rigid, extended position as seen in Figure 1 and which permits the links 71 to break upwardly, as seen in Figure 8, so that the shaft 66 may swing with the arms 63 away from the fan casing 19 and toward the hopper 42, when a lever 75 which is fixed to the collar 70 is swung from its full line to its dotted line position of Figure 1.

The shafts 24 and 66 are connected by a friction gearing, designated generally 76, of any suitable type, such as a friction gear 77 fixed to the shaft 66 and a tapered friction pinion 78 fixed to the shaft 24. The gear 77 is held in proper frictional contact with the pinion 78 when the link 71 is in its extended position of Figures 1 and 2 and is disengaged from said pinion when the link is broken and the arms 63 and shaft 66 are swung with the gear 77 to the positions of Figure 8.

As best seen in Figure 6, a rectangular housing 79 is secured to and depends from the bottom of the hopper and has a flanged open lower end 80 which registers with an opening 81 in a portion of the top part of the conduit 39. The flanged portion of said open end 80 is secured to the pipe 39 around its opening 81. A supporting plate 82 which may be formed of one or more plies is disposed in the housing 79 and secured to the hopper bottom portion 57 and has an opening 83 registering with the outlet 58. A valve plate 84 is slidably supported against the underside of the plate 82 by headed fastenings 85 which extend upwardly through elongated slots 86 in the plate 84 and which are anchored in the plate 82 to slidably support the valve plate 84 for sliding movement against the underside of the plate 82 and longitudinally of said plate. The valve plate 84 is provided with an opening 87 which is movable into and out of registery with the openings 58 and 83 or into partial registration therewith. The valve plate 84 has a depending flange 88 at one end thereof in which is swivelly mounted an end of a screw 89 which extends outwardly through a threaded boss 90 of one wall of the housing 79 and which has a handle 91 in its outer end for manually turning the screw for moving the valve plate so that its opening 87 will be moved into and out of full registration with the openings 58 and 83.

A bushing 50' is secured to and extends into the housing 79 and contains an eccentric bearing sleeve 51' in the eccentric bore 52' of which is journaled a shaft 53'. A brush 92, which may correspond in construction of the brush 54 is fixed to the inner end of the shaft 53' and revolves in the housing 79 and contacts or substantially contacts the valve opening 87. The outer, exposed end of the sleeve 51' is provided with a lever 59' by which the shaft 53' and brush 92 may be adjusted upwardly or downwardly in the same manner and for the same purpose as heretofore described in reference to the shaft 53 and brush 54 and a setscrew 60' mounted similar to the setscrew 60 retains the parts in adjusted positions. A belt pulley 93 is fixed to the outer end of the shaft 53' and is connected to the belt pulley 61 by an endless belt 94. A pivotally mounted spring urged belt tightener 95, as seen in Figure 1, maintains proper tension on the belt 94.

A three-sided brush guide 96 depends from the bottom ply of the plate 82 and is disposed around a portion of the brush 92. The guide plate 96 has an opening 97 through which an end of the valve plate 84 is slidably movable and functions to prevent the brush 92 from spreading. The hopper bottom 49 is provided with a removable clean-out plug 98. An air injection tube 99 has a flared inlet end 100 disposed in the pipe 39 and opening toward the inlet end thereof. The tube 99 extends upwardly through the hopper 42 and has a downwardly opening discharge end 100a located adjacent the top of the hopper and an intermediate discharge port 101 which opens near the bottom of the hopper downwardly and toward the outlet 58.

Assuming that the parts are in their positions of Figures 1 and 4 with the engine 18 in operation and with the hopper 42 containing a finely divided material, not shown, operation of the impellers 32 and 33 will create an air blast through the pipe 39 toward the outlet manifold 40 and a portion of the air will pass upwardly through the tube 99 through its outlet 100 to build up a pressure in the top of the hopper 42 above the material and additional air will be ejected into the bottom portion of the hopper through the outlet 101. A greater pressure will be maintained in the hopper 42 than in the tube 39 since the pressure is more readily released from the tube 39 through the manifold 40 so that no back pressure will exist in the outlet 58. Simultaneously, the shaft 66 will be driven by the friction gearing 76 to drive the shafts 53 and 53' through the belt pulley drive as previously described for revolving the brushes 54 and 92 in the directions as indicated by the arrows 102 in Figure 4. The air blast from the outlet 101 will be against a portion of the periphery of the brush 54 and in the direction of its rotation so that the material in the hopper will be agitated by the brush 54 and agitator elements 56 and will be forced outwardly through the outlet 58 by the brush 54 and through the openings 83 and 87 onto the periphery of the brush 92 from which it will be ejected by centrifugal force and gravity into the pipe 39 to be forced under pressure through the outlet manifold 40. Obviously, the extent of opening of the valve plate opening 87 and the adjustment of the brushes 54 and 92 toward and away from the openings 58 and 87, respectively, will vary the amount of material discharged into the pipe 39 in any given period of time. It will also be readily apparent that the heat from the engine 18 and the exhaust which are propelled through the pipe 39 will heat said pipe and the hopper 42 to maintain the material in a dry and loose condition to facilitate efficient operation of the apparatus. By moving the shaft 66 to its position of Figure 8, as previously explained, rotation of the brushes can be interrupted without stopping operation of the engine 18 and impellers 32 and 33.

Various modifications and changes are contemplated and may obviously be resorted to, without departing from the spirit or scope of the invention as hereinafter defined by the appended claims.

I claim as my invention:

1. In an apparatus for dispensing dry materials under pressure, a hopper, a conduit through which air is impelled under pressure toward an outlet end thereof, said conduit extending beneath the hopper, a housing connected to the bottom of the hopper and to said conduit, said conduit having an opening registering with said housing, the hopper bottom having a restricted outlet communicating with the housing, a rotary driven brush mounted in the hopper and having a portion of its periphery disposed to contact or substantially contact the hopper outlet, a rotary driven brush mounted in said housing and having a portion of its periphery disposed beneath and adjacent the hopper outlet, said brushes being driven simultaneously whereby the first mentioned circular brush is adapted to agitate and convey a dry material contained in said hopper to the hopper outlet and onto the last mentioned circular brush to be discharged therefrom by gravity and centrifugal force through the housing into said conduit, a closure for closing the top of said hopper and for sealing the hopper above the hopper outlet, and an air pipe having an inlet end disposed in said conduit and opening away from the outlet end of the conduit, said air pipe having an outlet end opening adjacent the top of the hopper for producing a pressure in the hopper.

2. An apparatus as in claim 1, said air pipe having a second outlet opening downwardly and toward the hopper outlet for directing a stream of air under pressure in a direction corresponding to the direction of rotation of the first mentioned brush.

3. In an apparatus for dispensing dry materials under pressure, a hopper, a conduit through which air is impelled under pressure toward an outlet end thereof, said conduit extending beneath the hopper, a housing connected to the bottom of the hopper and to said conduit, said conduit having an opening registering with said housing, the hopper bottom having a restricted outlet communicating with the housing, a rotary driven brush mounted in the hopper and having a portion of its periphery disposed to contact or substantially contact the hopper outlet, a rotary driven brush mounted in said housing and having a portion of its periphery disposed beneath and adjacent the hopper outlet, said brushes being driven simultaneously whereby the first mentioned circular brush is adapted to agitate and convey a dry material contained in said hopper to the hopper outlet and onto the last mentioned circular brush to be discharged therefrom by gravity and centrifugal force through the housing into said conduit, and means eccentrically mounting said brushes for displacing the brushes toward and away from the hopper outlet to vary the rate of flow of material therethrough.

4. In an apparatus for dispensing dry materials under pressure, a conduit through which air is propelled under pressure toward an outlet end thereof, a hopper disposed above a portion of the conduit, a housing connected to the bottom of the hopper and to said conduit, said conduit having a large opening registering with said housing, said hopper bottom having a restricted outlet communicating with the housing, a rotary driven circular brush mounted in said hopper and having a portion of its periphery disposed to contact or substantially contact the hopper outlet, a second rotary driven circular brush mounted in said housing and having a portion of its periphery disposed beneath and adjacent the hopper outlet, said brushes being driven simultaneously whereby the first mentioned circular brush is adapted to agitate and convey a dry material contained in said hopper to the hopper outlet and onto the second rotary brush to be discharged therefrom by gravity and centrifugal force through the housing into said conduit, means for sealing and closing the hopper above said hopper outlet, and an air pipe having an inlet end disposed in said conduit and opening away from said conduit outlet, said air pipe having an outlet end opening into the hopper adjacent the top thereof for maintaining a pressure in the hopper while the dispensing apparatus is in operation.

5. An apparatus as in claim 4, said air pipe having a second outlet opening downwardly and toward the hopper outlet for directing a stream of air under pressure toward said hopper outlet and in a direction corresponding to the direction of rotation of the adjacent portion of the first mentioned brush.

6. In an apparatus for dispensing dry materials under pressure, a conduit through which air is propelled under pressure toward an outlet end thereof, a hopper disposed above a portion of the conduit, a housing connected to the bottom of the hopper and to said conduit, said conduit having a large opening registering with said housing, said hopper bottom having a restricted outlet communicating with the housing, a rotary driven circular brush mounted in said hopper and having a portion of its periphery disposed to contact or substantially contact the hopper outlet, a second rotary driven circular brush mounted in said housing and having a portion of its periphery disposed beneath and adjacent the hopper outlet, said brushes being driven simultaneously whereby the first mentioned circular brush is adapted to agitate and convey a dry material contained in said hopper to the hopper outlet and onto the second rotary brush to be discharged therefrom by gravity and centrifugal force through the housing into said conduit, and means eccentrically mounting said brushes and adjustable for displacing the brushes toward and away from the hopper outlet to vary the rate of flow of the material therethrough.

ALONZO ZEB THOMPSON.

References Cited in the file of this patent

UNITED STATES PATENTS

| Number | Name | Date |
| --- | --- | --- |
| 425,338 | Muller | Apr. 8, 1890 |
| 773,205 | Green | Oct. 25, 1904 |
| 1,188,127 | Wright | June 20, 1916 |
| 1,282,697 | Johnson | Oct. 22, 1918 |
| 1,371,343 | Bow | Mar. 15, 1921 |
| 1,561,039 | Walker | Nov. 10, 1925 |
| 1,968,541 | Tatum | July 31, 1934 |
| 2,212,032 | Moon | Aug. 20, 1940 |
| 2,253,802 | Ness | Aug. 26, 1941 |